July 11, 1967  G. F. ADOLPHI  3,330,145
MACHINE AND METHOD FOR TAPERING ROD-LIKE TUBULAR WORKPIECES
Filed Oct. 5, 1964  11 Sheets-Sheet 1
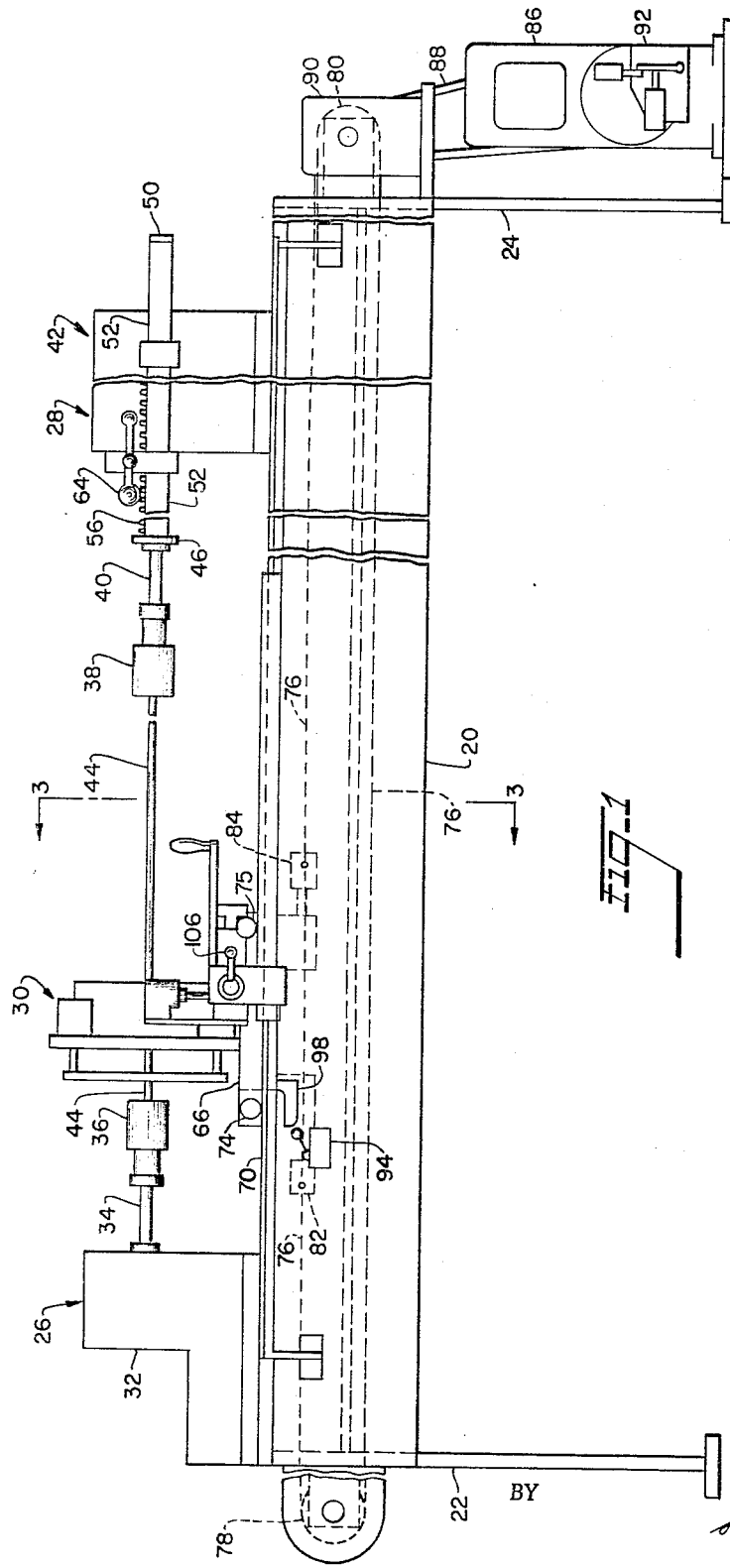
INVENTOR
GEORGE F. ADOLPHI
BY
Strauch, Nolan & Neale
ATTORNEYS

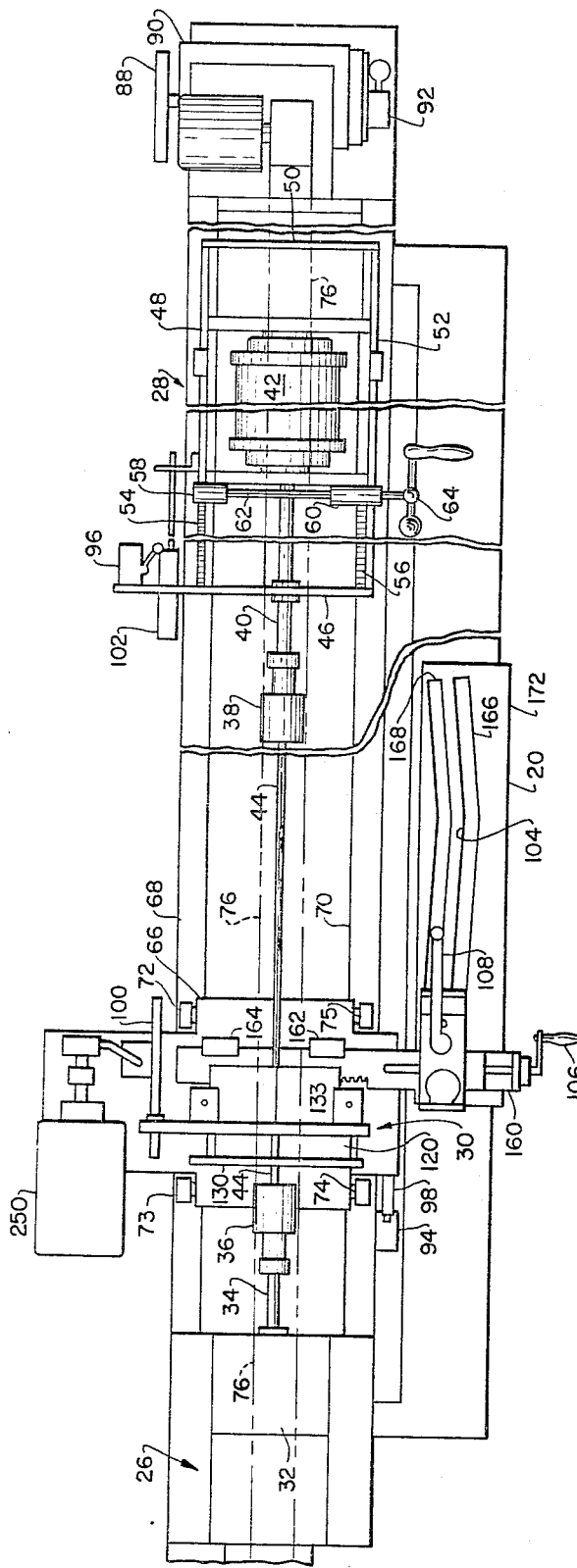

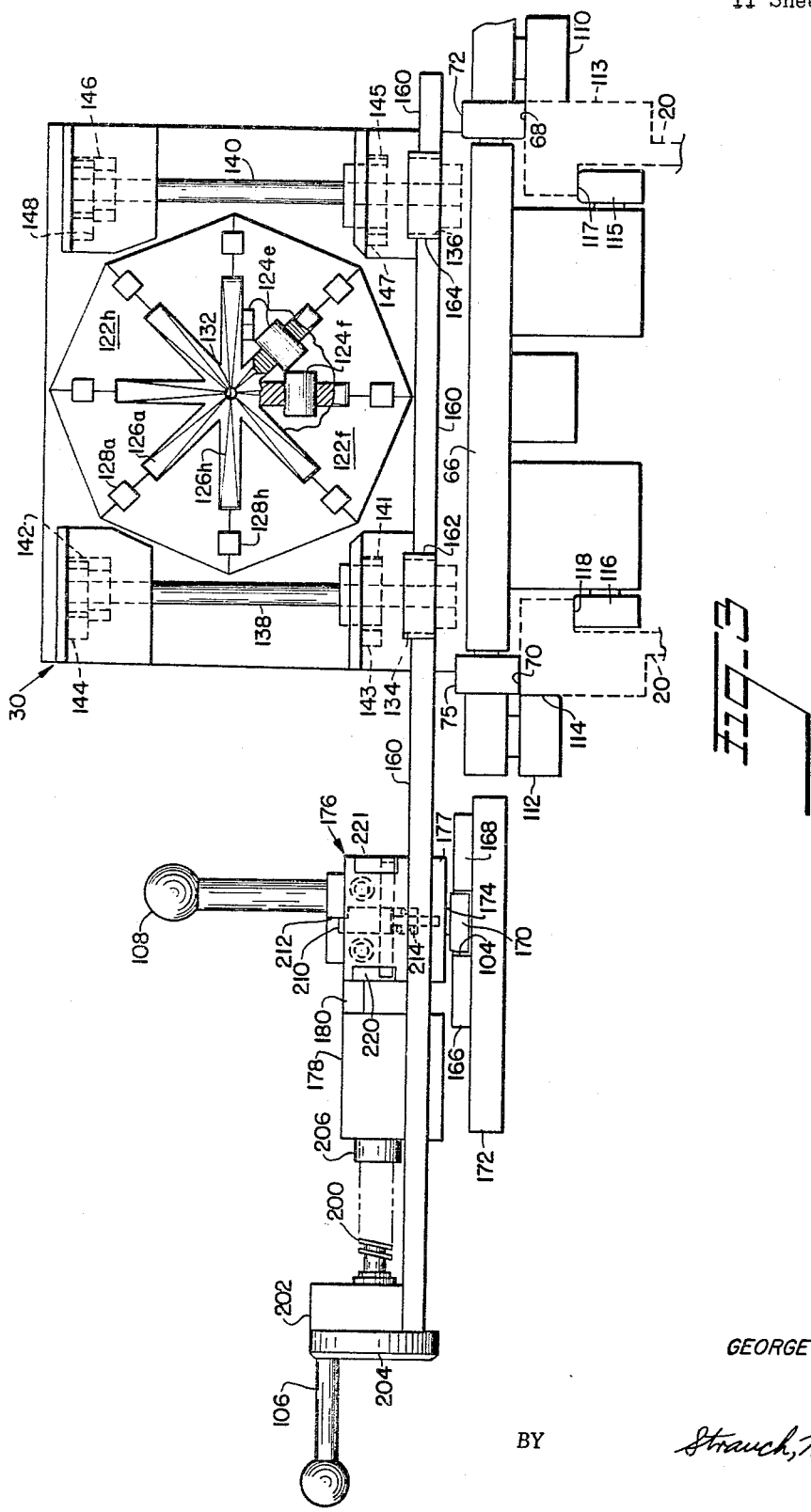

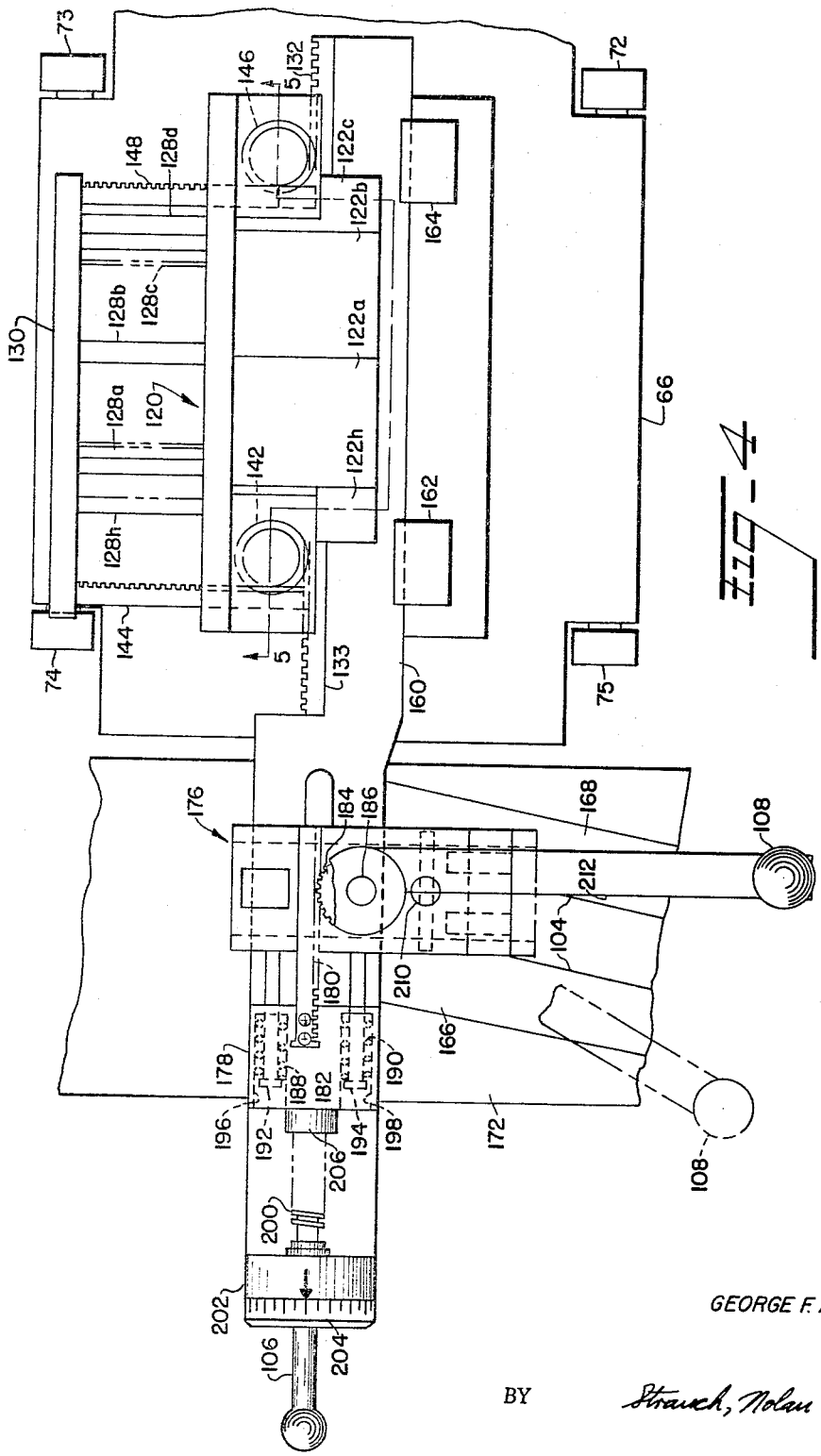

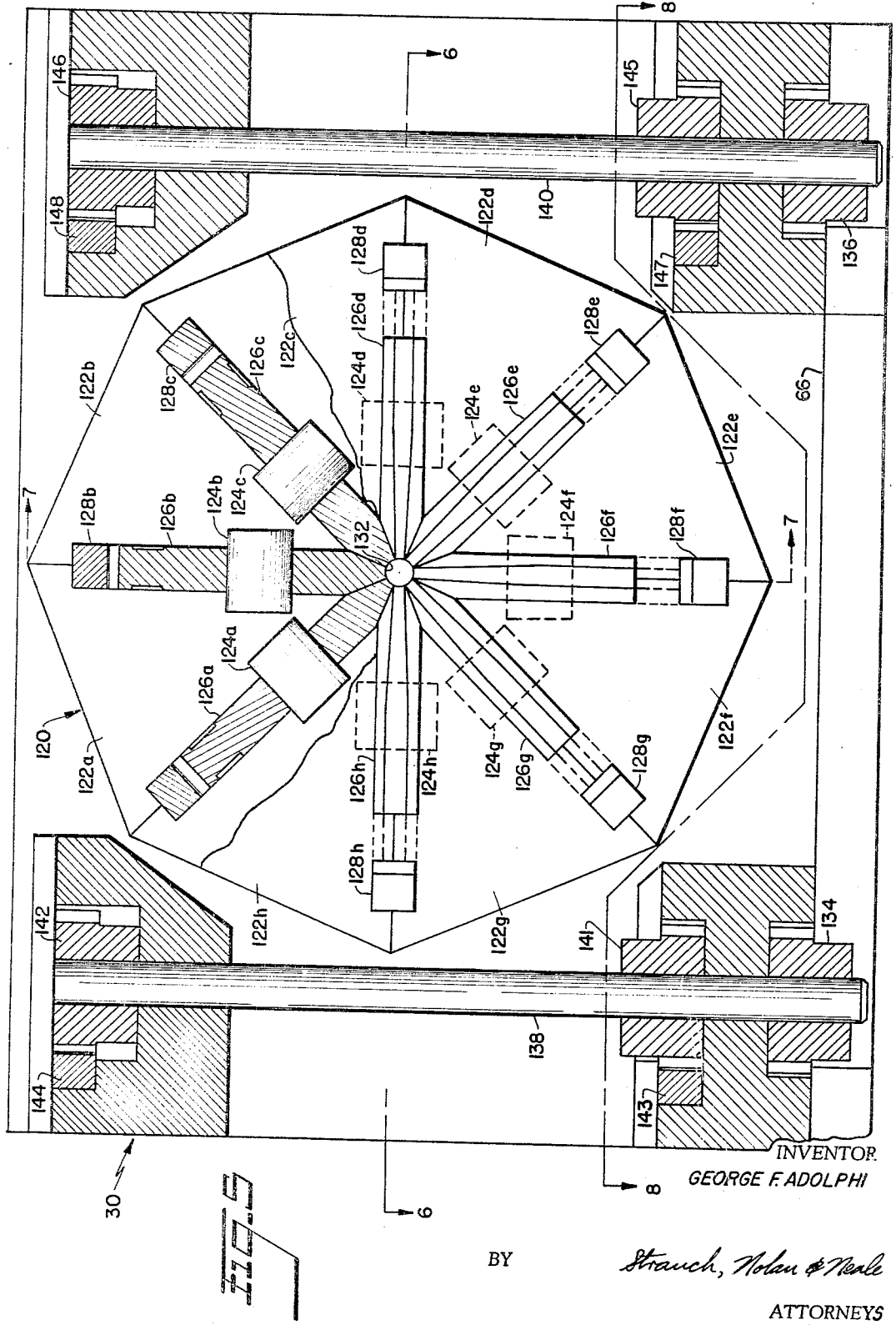

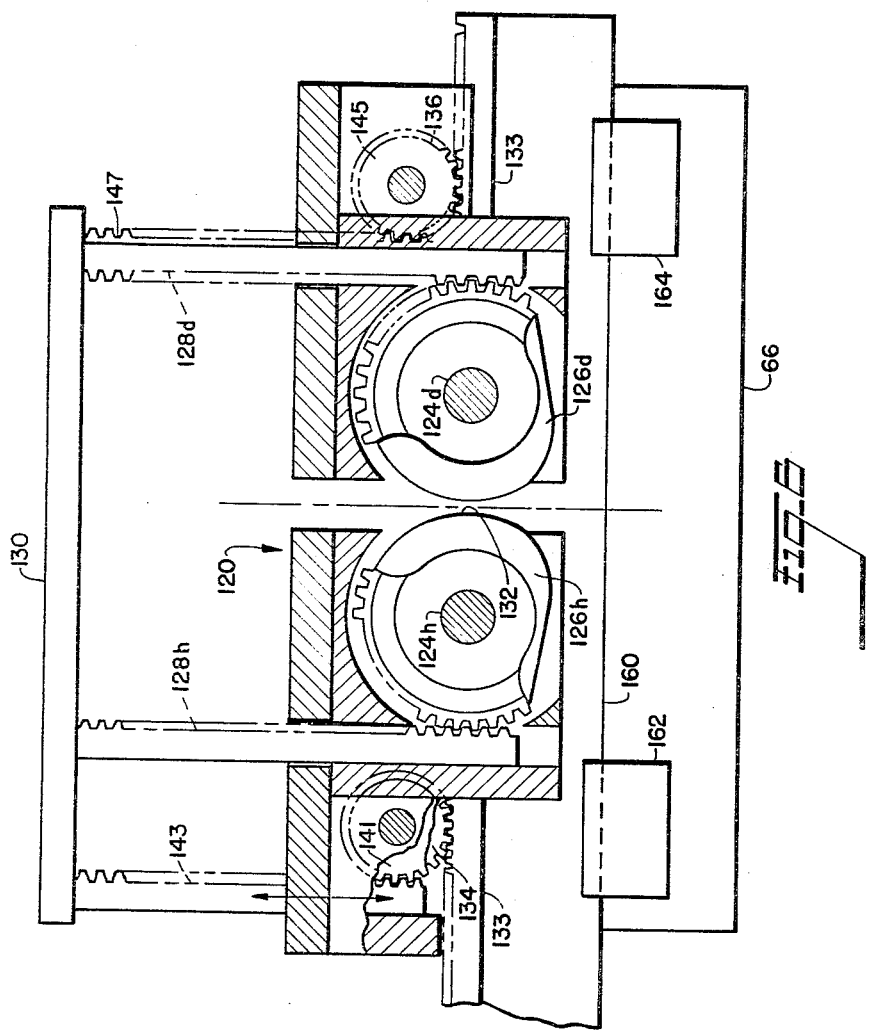

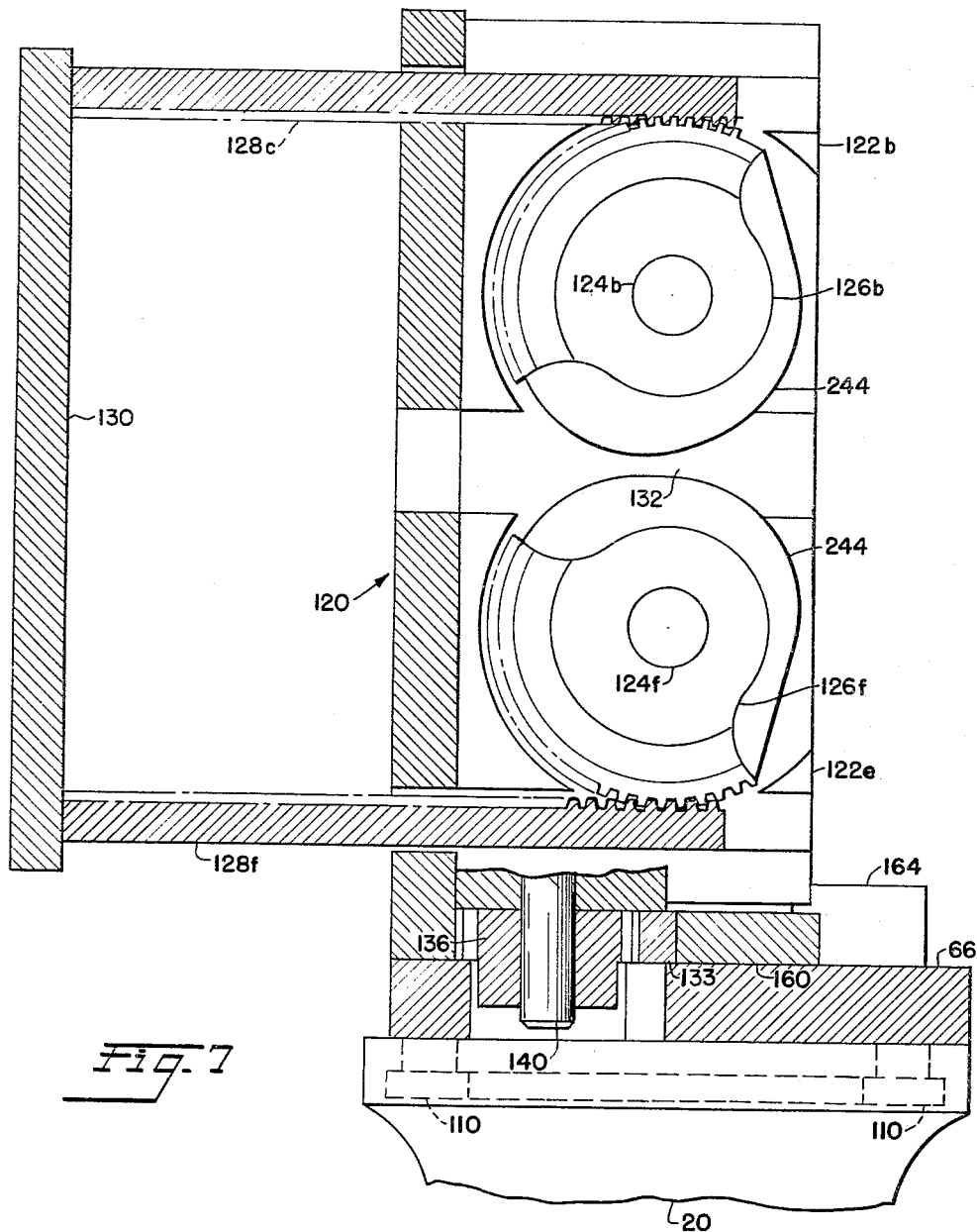

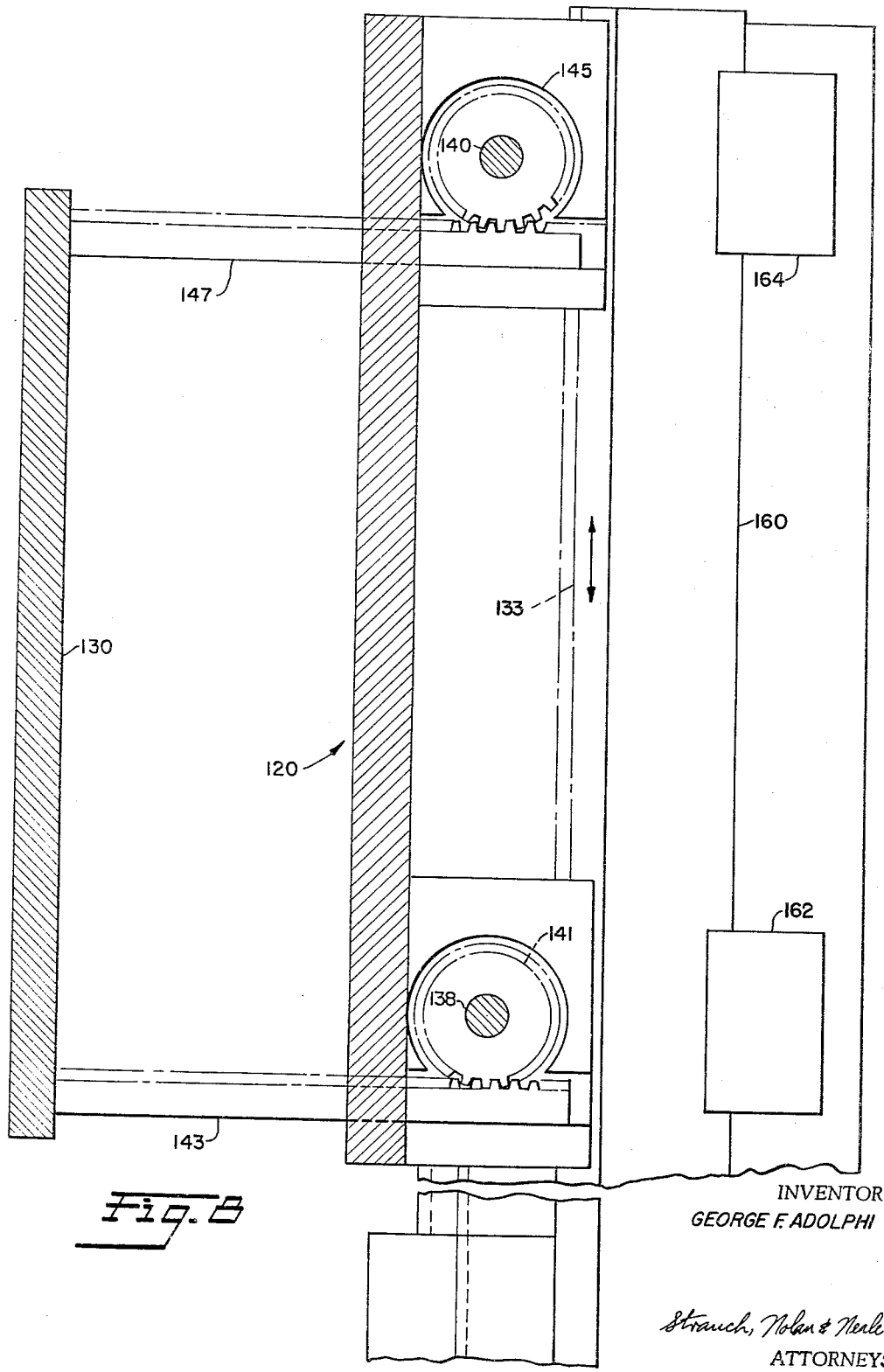

July 11, 1967 G. F. ADOLPHI 3,330,145
MACHINE AND METHOD FOR TAPERING ROD-LIKE TUBULAR WORKPIECES
Filed Oct. 5, 1964 11 Sheets-Sheet 9
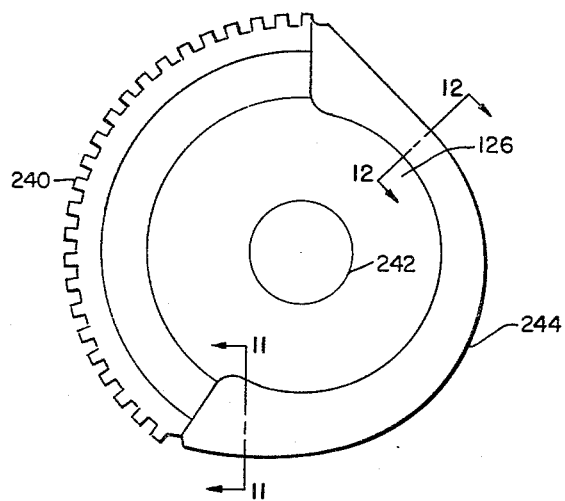
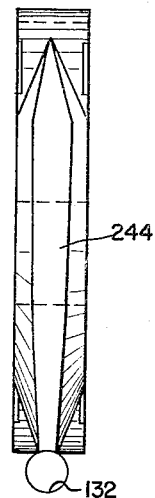
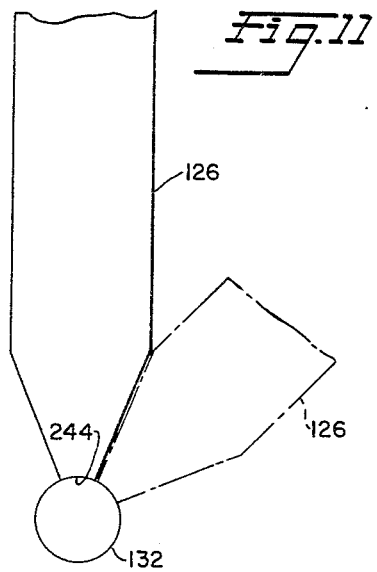
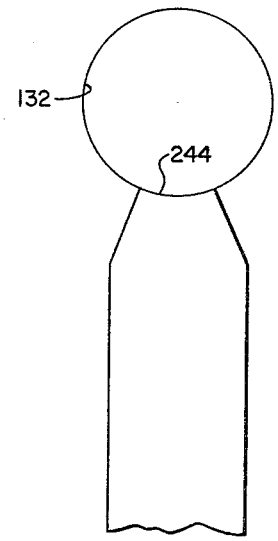
INVENTOR
GEORGE F. ADOLPHI
BY Strauch, Nolan & Neale
ATTORNEYS

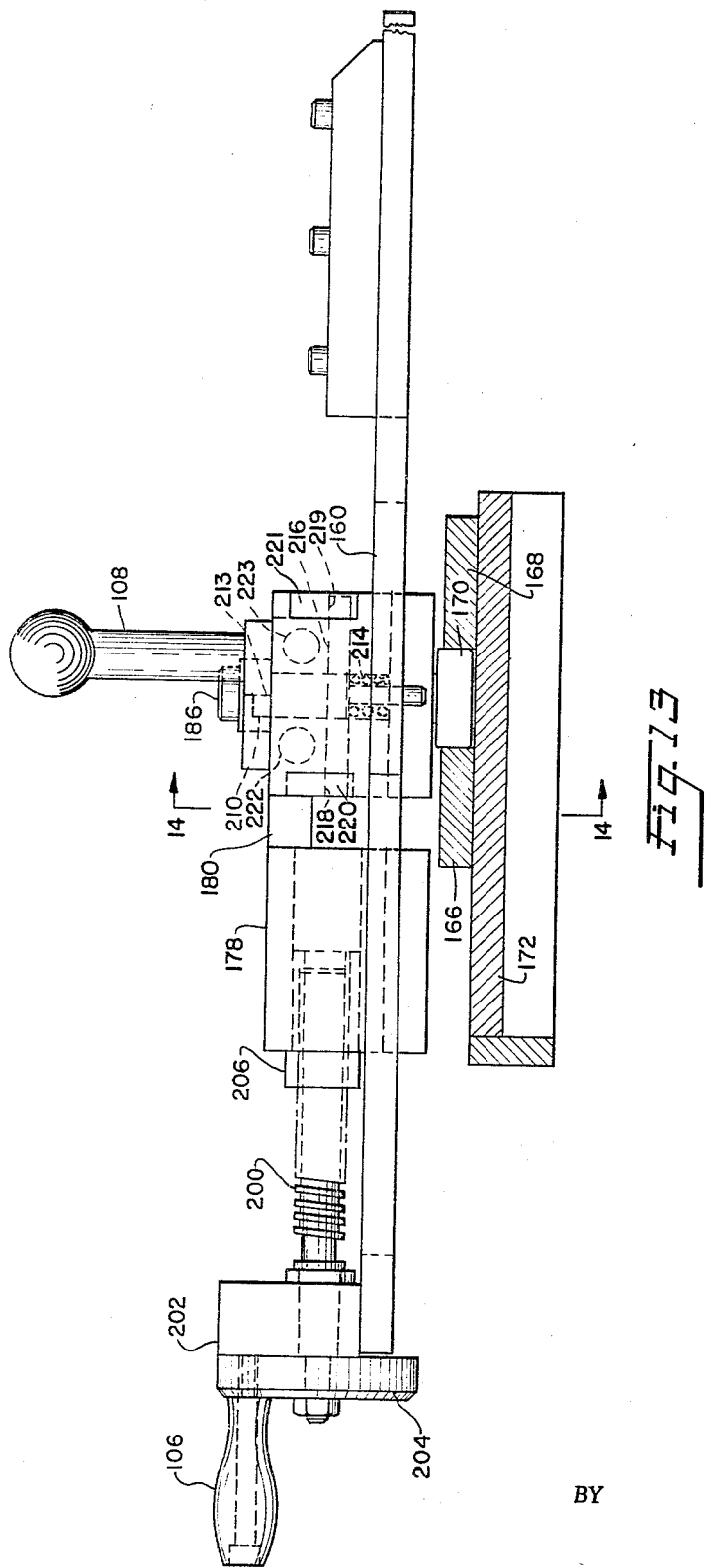

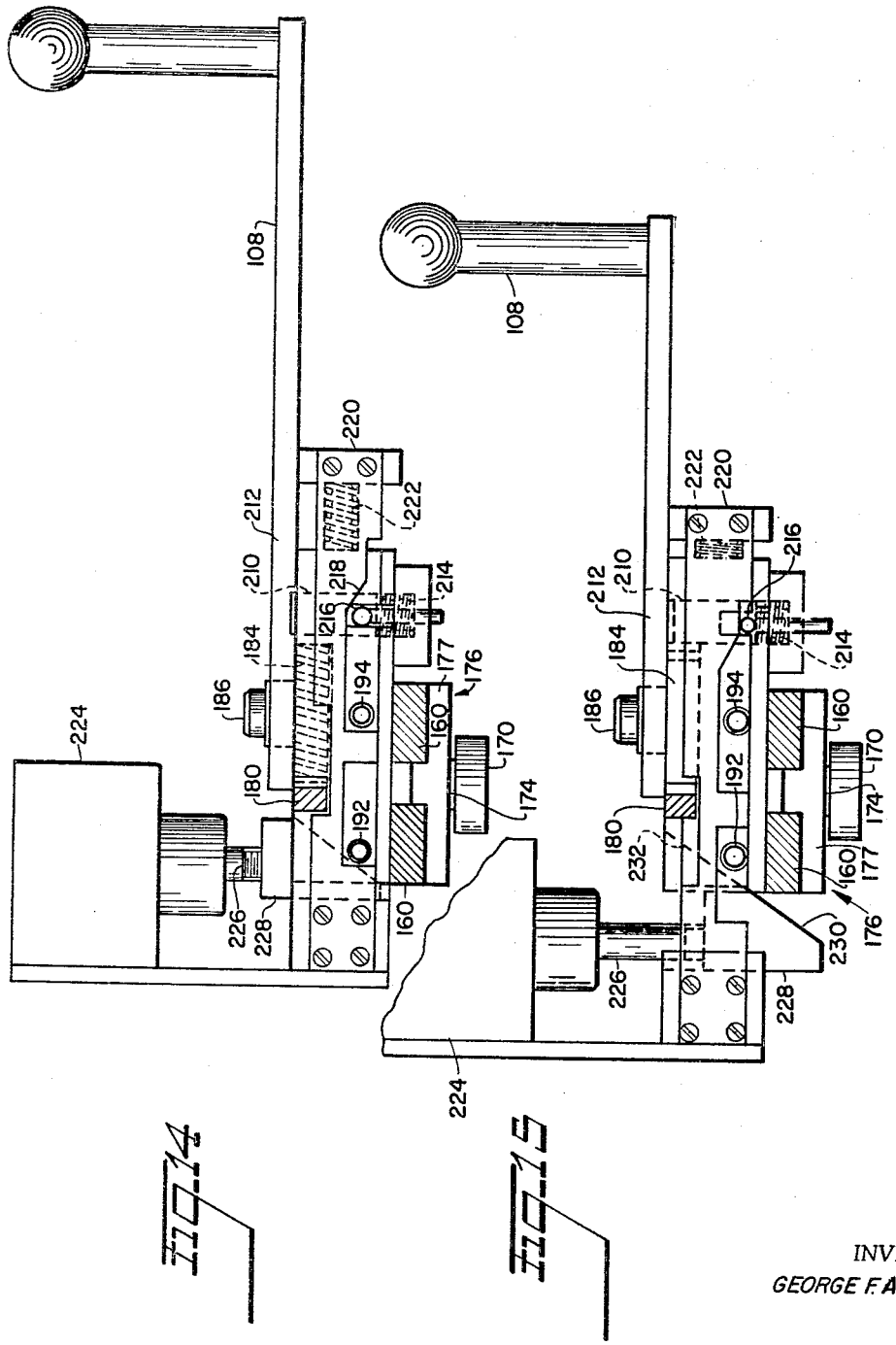

3,330,145
MACHINE AND METHOD FOR TAPERING ROD-LIKE TUBULAR WORKPIECES
George F. Adolphi, La Mesa, Calif., assignor to Straza Industries, El Cajon, Calif., a corporation of California
Filed Oct. 5, 1964, Ser. No. 401,349
17 Claims. (Cl. 72—274)

The present invention relates to improvements in machines and methods for externally tapering tubular and rod like workpieces and more particularly to improvements in machines and methods for converting tubes of uniform cross-section to tubes of converging diverging form preferably while maintaining uniformity of the wall thickness of the tube throughout its length.

While not so limited in their application, the present primary use of centrally tapered integral tubes is in the nozzle of liquid fluid rocket motors. These tubes are referred to variously as coolant tubes, nozzle tubes, hour glass tubes, etc. Their distinctive physical feature from a fabrication standpoint is that the internal and external diameters of the ends of the tubes are larger than the internal and external diameters of the tubes at their centers or at some other point intermediate their length.

Prior to the present invention, it was customary to form tubes of this type in what was known as a tube swaging machine. In such machines, the portion of the tube to be tapered was passed between a pair of opposed dies each having concave faces of approximately 150° in arcuate extent which were adjustable to define an opening of progressively decreasing size between them. In tube swaging machines of this type, the tube is rotated as it passes longitudinally between the dies to produce a swaging action. Since the dies embrace only approximately 300° of the total arcuate extent of the tube, there is a tendency to undesirably deform the tube wall from true circularity a swell as to impart a bend or twist to the tube as it is passed between the dies. An example of such prior art machines is disclosed in United States Patent No. 3,019,678 issued Feb. 6, 1962 for Tube Tapering Machine to C. K. Le Fiell.

The primary object of the present invention is to provide a machine for tapering tubular and rod-like workpieces in which the tapering of the tube is accomplished by drawing the workpiece through a draw die assembly having a peripherally continuous variable cross-section iris, the cross-section of which is controlled throughout the passage of the tube therethrough to provide the required taper, the relative motion between the workpiece and die assembly being pure translatory motion axially of the workpiece.

A further object of the present invention is to provide a machine for externally tapering tubular and rod-like workpieces in which the tapering of the workpiece is effected by multiple axial translatory passes through a draw die assembly having a variable diameter iris in which the workpiece is maintained under tension and the work forming stroke of the draw die assembly increases with each successive stroke to accommodate the gradual elongation of the workpiece as the tapering progresses.

Further objects of the present invention are to provide a machine for tapering tubular and rod-like workpieces by multiple axial translatory passes of the workpiece through a draw die having a variable diameter iris in which the diameter of the iris is automatically progressively decreased to a minimum and thereafter increased to a maximum incident to longitudinal movement of the draw die assembly along the workpiece during its working stroke, in which the working stroke of the draw die assembly is automatically terminated a predetermined distance from the movable end of the workpiece, and/or the iris of the draw die assembly automatically opened a predetermined amount and the draw die assembly restored to its initial position.

A further object of the present invention is to provide a machine for tapering tubular rod-like workpieces by multiple axial translatory passes through a segmental variable diameter draw die assembly of the workpiece in which the workpiece is indexed circumferentially after each workpiece forming stroke of the draw die assembly to orient the portion of the workpiece which in the preceding work forming stroke was in alignment with a juncture of adjacent segments of the variable diameter draw die assembly in alignment with one of the segments prior to the next succeeding work forming stroke of the die assembly so that any longitudinally extending external ribs produced on the tube during any given work forming stroke is eliminated during the next succeeding work forming stroke.

A further object of the present invention is to provide a machine for tapering tubular and rod-like workpieces by the longitudinal reciprocation along the workpiece of a variable diameter draw die assembly in which the range of diameters of the draw die assembly throughout its working stroke may be selectively adjusted at the beginning of each such stroke so that each successive stroke increases the taper imparted to the workpiece.

A still further object of the present invention is to provide the improved method for tapering tubular and rod-like workpieces in which the workpiece, while under longitudinal tension, is passed by longitudinal translatory motion through a peripherally continuous constriction of progressively decreasing cross-section.

A still further object of the present invention is to provide an improved method of tapering tubular and rod-like workpieces while maintaining the uniformity of the wall thickness thereof in which the workpiece is subjected throughout its length (except for end regions each of predetermined lengths) to the effect of a converging diverging constricting force progressively along its length while maintaining the workpiece under tension sufficient that the metal displacement resulting from reduction in the internal and external diameter of the workpiece produces an increase in the length of the workpiece rather than an increase in its wall thickness.

These and other objects of the present invention will become more fully apparent by reference to the appended claims and as the following detailed description proceeds in reference to the accompanying drawings which are drawn substantially to scale and wherein:

FIGURE 1 is a front elevational view of a tapering machine of the present invention;

FIGURE 2 is a top plan view of the tapering machine of the present invention;

FIGURE 3 is a sectional view taken substantially along the line 3—3 of FIGURE 1;

FIGURE 4 is a top plan view partially in section of the variable diameter draw die asesmbly and its associated control mechanism, the structure being shown partially in section;

FIGURE 5 is a side elevational view partially in section of the variable diameter draw die assembly being taken substantially along the line 5—5 of FIGURE 4;

FIGURE 6 is a horizontal sectional view through the variable diameter draw die assembly taken substantially along the line 6—6 of FIGURE 5;

FIGURE 7 is a vertical sectional view through the variable diameter draw die assembly taken substantially along the line 7—7 of FIGURE 5;

FIGURE 8 is a fragmentary sectional view taken substantially along the line 8—8 of FIGURE 5;

FIGURE 9 is a detailed side elevational view of one of the combined die and gear segments of the variable diameter draw die assembly;

FIGURE 10 is a right end view of the structure shown in FIGURE 9;

FIGURE 11 is substantially a section along the line 11—11 of FIGURE 9 diagrammatically illustrating the circumferential juxtaposition of adjacent draw die segments to define the iris of the draw die assemblies;

FIGURE 12 is substantially a section along the line 12—12 of FIGURE 9 diagrammatically illustrating the relationship of the transverse contour of the peripheral groove of one of the draw die segments to the circle representing the iris of the variable diameter draw die assembly, when the segment is positioned with its section plane 12—12 in the plane of the iris;

FIGURE 13 is a side elevational view of the control mechanism for controlling the diameter of the iris of the variable diameter draw die assembly;

FIGURE 14 is a front elevational view partially in section of the mechanism of FIGURE 13 showing the configuration of that mechanism when the iris of the draw die assembly has been closed to its position at the beginning of its working stroke; and FIGURE 15 is a view similar to FIGURE 14 but showing the configuration of that mechanism after the variable diameter draw die assembly has been restored to its initial position at the end of the working stroke.

Referring now in detail to the drawings, and particularly to FIGURES 1 and 2, the tapering machine of the present invention comprises a frame or bed 20 of H-beam construction supported at its opposite ends upon legs 22 and 24 and supporting a head stock assembly 26, a tail stock assembly 28 and a variable diameter draw die assembly 30 mounted for longitudinal movement along the bed 20 between the head stock and the tail stock assemblies 26 and 28.

The headstock assembly 26 embodies an indexing mechanism 32 (not shown in detail but embodying an air cylinder operated pawl and ratchet mechanism), a rotatable head stock spindle 34 rotated by the pawl and ratchet mechanism and a head stock gripper jaw assembly 36 fixed to the free end of the spindle 34.

The tail stock assembly 28 comprises a tail stock gripper jaw assembly 38 fixed to the end of the rotatable tail stock shaft 40 which is axially fixed to the piston (not shown) of the air cylinder 42. The metal tubular or rod-like workpiece 44 extends between and is gripped at its opposite ends by the gripper jaw assemblies 36 and 38. The gripper jaw assembly 38 is longitudinally movable to accommodate elongation of the workpiece 44 as it is progressively deformed. The air cylinder 42 maintains a predetermined axial tension upon the workpiece 44 longitudinally so that the metal displaced by tapering of the workpiece is absorbed by axial elongation of the workpiece rather than by increase in wall thickness when the workpiece is tubular. The tail stock spindle 40 is rotatably connected at one end to the piston of cylinder 42 and is axially fixed relative to and rotatably supported adjacent its opposite end by a transversely extending end member 46 of a movable rectangular frame formed by the members 46, 48, 50 and 52 which embraces the air cylinder 42. This frame is mounted on the tail stock assembly 28 for translatory motion axially of shaft 40. Longitudinally extending members 48 and 52 of this frame carry racks 54 and 56 respectively which engage pinions 58 and 60 respectively fixed to a transverse shaft 62 which is journalled about an axis fixed relative to the cylinder 42. Shaft 62 is manually rotatable by handle 64 to longitudinally position the frame 46, 48, 50, 52, the gripper assembly 38, spindle 40 and the piston of the air cylinder 42 to facilitate initial mounting of the workpiece 44 between the gripper assemblies 36 and 38.

The variable diameter draw die assembly includes a carriage 66 mounted for longitudinal rolling translatory movement along the tracks 68 and 70 on the frame 20 by rollers 72, 73, 74 and 75 journalled thereon.

The longitudinal position of the carriage 66 is determined by a chain 76, the runs of which are best shown in FIGURE 1. Chain 76 runs between sprockets 78 and 80 at opposite ends of the frame 20 beneath the plane of the tracks 68 and 70, being connected to the carriage 66 at its opposite ends as indicated at 82 and 84 in FIGURE 1. Sprocket 78 is an indler sprocket. Sprocket 80 is the driving sprocket for chain 76. Driving sprocket 80 derives its power from a suitable power source (not shown) through a hydraulic transmission 86, a chain drive 88 and a speed reduction gear box 90. The hydraulic transmission is controlled by a reversing mechanism 92 as will be described presently.

The limits of longitudinal movement of the draw die assembly 30 and the carriage 66 are determined by stop and reversing microswitches 94 (FIGURES 1 and 2) and 96 (FIGURE 2) mounted respectively on the frame 20 and the cross member 46.

The carriage 66 supports the microswitch actuator 98 (FIGURE 1) which, when the carriage 66 is restored to its initial or home position, actuates stop microswitch 94 to stop the carriage at the end of its cycle by placing the hydraulic transmission 86 in neutral through control of the reversing mechanism 92. The reversing microswitch 96 is actuated by an adjustable finger 100 (FIGURE 2) carried by the variable diameter draw die assembly which engages a push bar cam 102 mounted on the movable frame members 46 and 48 to actuate the microswitch 96 when the variable diameter draw die assembly 30 reaches a predetermined minimum distance from the tail stock gripper assembly 38. By this arrangement, as the workpiece 44 elongates during each successive pass of the variable diameter draw die assembly 30, the gripper assembly 38, frame 46, 48, 50 and 52, cam 102 and microswitch 92 move as a unit to the right as viewed in FIGURES 1 and 2 under the influence of the air cylinder 42. Since the microswitch 96 and its actuator 102 moves with the gripper assembly 38 the distance which finger 100 must move from its home position to actuate cam 102 increases with workpiece elongation and the overall lengths of the successive working strokes of the variable diameter draw die assembly 30, thus progressively increase to assure that, despite the elongation of the tube during its tapering, the full length of the tapered portion of the tube will be traversed by the variable diameter draw die assembly during each working stroke.

With continued reference to FIGURES 1 and 2, the converging-diverging motion with respect to the workpiece axis of the operative surfaces of the die segments which form the iris of the variable diameter draw die assembly is controlled during each working stroke by the fixed cam track 104. The diameter of the iris at the beginning of each working stroke is determined by manual adjustment of the handle 106 and the working stroke is initiated by movement of the cocking lever 108 to the position illustrated in FIGURE 2 to close the iris of the variable diameter draw die assembly to its operating position at the beginning of each working stroke. Actuation of the microswitch 96 at the end of each working stroke is effective to open the iris of the variable diameter draw die assembly 30 a predetermined amount and to automatically reverse the hydraulic transmission 86 to restore the variable diameter draw die assembly to its home position as illustrated in FIGURES 1 and 2.

Referring now to FIGURE 3, the position of the variable diameter draw die assembly 30 relative to the frame 20 is further established by slide rollers 110 and 112 rotatable about vertical axes and peripherally engaging opposed parallel vertical planar track surfaces 113 and 114 on the rear and front of the frame 20 and rollers 115 and 116 disposed beneath and engaging downwardly facing horizontal planar track surfaces 117 and 118 on the frame 20. The track surfaces 68, 70, 113, 114 and 117 are all planar and perpendicular to a common plane transverse to the base frame 20. By this arrangement, the position of the variable diameter draw die assembly 30 is rigidly maintained against forward or rearward, or upward or downward motion relative to the frame 20 so that the axis of its iris 132 is at all times coincident with the axis of the workpiece and supported by the gripper jaw assemblies 36 and 38.

Referring next to FIGURE 5, the draw die assembly 30 comprises a draw die unit 120 formed by a plurality of complementary rigid metallic prism shaped members 122a–h rigidly interconnected, rigidly mounted on carriage 66 and having complementary recesses on their abutting faces to provide supports for the stub shafts 124a–h, chambers for the combined die and gear segment members 126a–h respectively journalled on shafts 124a–h and complementary through guide channels for the racks 128a–h. The teeth of racks 128a–h mesh with the gear segment portions of the elements 126a–h respectively. As is apparent from FIGURE 7, all of the racks 128a–h are connected at their ends adjacent head stock assembly 26 to a common actuator plate 130. As will be explained in detail presently with reference to FIGURES 9–12, the die segments 126a–h are so formed that, when translatory movement of the actuator plate 130 toward the die unit 120 rotates the die segments, the diameter of the iris 132 defined thereby will increase and when movement of the actuator plate 130 away from the unit 120 will rotate the die segments 126a–h concomitantly in the opposite direction, the diameter of the iris 132 will decrease.

The motion of the actuator plate 130 is effected by alternate longitudinal motion of a rack 133 (FIGURE 8) which is in constant mesh with the pinions 134 and 136 fixed to the lower ends of the shafts 138 and 140 respectively (FIGURE 5). Shaft 138 is journalled in the fixed frame of the die assembly 30 and has fixed thereto pinions 141 and 142 in constant mesh with the racks 143 and 144 respectively. Similarly, shaft 140 is journalled in the frame of the die assembly 30 and has fixed thereto pinions 145 and 146 in constant mesh with the racks 147 and 148 respectively. Racks 143, 144, 147 and 148 are, as is illustrated in FIGURES 6 and 8 for racks 143 and 147, fixed at the rear end to the actuator plate 130 and guided in the frame of the die assembly 30. As is apparent from FIGURES 5, 6, and 8, movement of the rack 133 toward the rear of the machine imparts counterclockwise rotation to the pinions 134 and 136 with which it meshes, to shafts 138 and 240 to which pinions 134 and 136 are fixed and to the pinions 141, 142, 145 and 146 mounted thereon and moves the racks 143, 144, 147 and 148 and actuator plate 130 toward the die unit 120 to rotate segments 128a–h to increase the diameter of iris 132. Conversely, movement of the rack 133 toward the front of the machine imparts clockwise rotation to the shafts 138 and 140 and the pinions thereon and moves the actuator plate 130 away from the die unit 120 thereby decreasing the diameter of the iris 132.

The position of the rack 133 thus determines the diameter of the iris 132 of the draw die assembly. The position of the rack 133 transversely of the bed 20 is controlled by the handles 106 and 108 and the cam track 104.

Mechanism for positioning the rack 133 is best illustrated in FIGURES 3, 4 and 13. As shown in FIGURE 4, the rack 133 is fixed to one edge of a slide 160 which is retained relative to the carriage 66 by guide blocks 162 and 164.

Referring to FIGURE 3, the cam groove 104 is defined by a pair of plates 166 and 168 between which a cam roller 170 is confined. The plates 168 and 166 are fixed to a support plate 172 fixed to the machine frame 20 as is illustrated in FIGURES 1 and 2.

The cam roller 170 is journalled upon a shaft 174 fixed to the bottom of a latch block assembly 176. The cam track 104 and the roller 170 thus determine the position fore and aft of the machine of the latch block assembly 176. Latch block 177 of assembly 176 is connected to a sliding block 178 by a rack 180 fixed to the block 178 by screws 182 as shown in FIGURE 4 and meshing with a pinion 184 fixed to a shaft 186, the angular position of which is determined by the handle 108. Block 178 is biased toward assembly 176 by a pair of compressed compression springs 188 and 190 surrounding bolts 192 and 194 respectively within recesses 196 and 198 respectively in a block 178 so that the springs 188 and 190 are compressed between the heads of the bolts 192 and 194 and the end walls of the recesses 196 and 198. The bolts 192 and 194 extend through apertures in the end walls of the recesses 196 and 198 and are fixed at their opposite end to the latch block 177 of assembly 176.

By this construction, movement of the lever 108 from its phantom line position to its full line position in FIGURE 4, pivots pinion 184 in a counterclockwise direction, moves rack 180 to the left as viewed in FIGURE 4, moves sliding block 178 to the left as viewed in FIGURE 4 to thereby compress springs 188 and 190. Upon release of the lever 108, the springs 188 and 190 will expand to restore sliding block 178 and lever 108 to their original position.

The slide 160 (on which rack 133 is mounted) is connected to the sliding block 178 through a screw mechanism comprising a screw 200 journalled in a bearing block 202 fixed to the slide 160 and having handwheel 106 and graduated index wheel 204 fixed to its end outward of the bearing block 202. The screw 200 is in threaded engagement with a nut 206 fixed to the sliding block 178. By this construction rotation of the index wheel 206 and the screw 200 under the control of the handwheel 106 controls the relative position of the slide 160 and the sliding block 178 by varying the spacing therebetween axially of screw 200.

In summary therefore, with the latch block assembly 176 at rest and the handle 108 in either of its illustrated limit positions, the diameter of the iris 132 of the variable diameter of draw die assembly can be adjusted by rotary manipulation of the handwheel 106. This is the adjustment which is made at the beginning of each working stroke of the variable diameter draw die assembly. In the illustrated embodiment this adjustment is made manually. It is of course obvious that for high volume production runs, this adjustment could be automated if desired.

After this adjustment is made, the lever 108 is moved from its phantom line position to its full line position as shown in FIGURE 4. This reduces the diameter of the iris 132 of the variable diameter draw die assembly to bring the die segments into direct contact with the workpiece at the beginning of the forming troke, and initiates operation of the variable diameter draw die assembly throughout its working stroke. In one practical embodiment, this iris diameter reduction under control of lever 108 is approximately .06 inch. During the working stroke, the position of the slide 160 and the diameter of the iris 132 of the die assembly is controlled by the contour of the cam groove 104, the lever 108 remaining in its full line position as shown in FIGURE 4 relative to the slide 160 throughout this entire working stroke. At the end of the working stroke, actuation of microswitch 96 is effective to release lever 108 to permit it to restore to its phantom line position as illustrated in FIGURE 4 under the influence of springs 188 and 190, thereby increasing the diameter of the iris 132 of the die assembly by about .06 inch so that the die segments will not contact the workpiece during the return stroke of the die assembly.

The structure by which the arm 108 is latched in its full line position of FIGURE 4 during the work forming stroke and released to its phantom line position of FIGURE 4 at the end of the work forming stroke is best illustrated in FIGURES 14 and 15. FIGURE 14 illustrates the configuration of the latching mechanism to lever 108 when in its full line position of FIGURE 4, and FIGURE 15 illustrates the configuration of the latching mechanism when the lever 108 in its phantom line position of FIGURE 4.

During the working stroke of the die asembly, the lever 108 is maintained in its full line position of FIGURE 4, its position of FIGURE 14, by the engagement of a latch 210 with a lower portion of its edge surface 212 as shown in FIGURE 4, the top surface of the pin 210 being formed with a transverse semicylindrical notch 213 (FIGURE 13).

Pin 210 is upwardly biased by a compression spring 124 and provided with a diametrically extending pin 216 the opposite ends of which are disposed in the path of cam surfaces 218 and 219 on slide bars 220 and 221 (FIGURES 13–15). Slide bars 220 and 221 are biased to the right as viewed in FIGURES 14 and 15 by compression springs 222 and 223.

At their opposite ends, slide bars 220 and 221 support an air cylinder 224 and movable output element 226 of which carries a wedge-shaped block 228, the inclined surface 230 of which engages a complementary inclined surface 232 on the latch block 177 of assembly 176. When the air cylinder 224 is actuated in response to actuation of the microswitch 96 (FIGURE 2) at the end of the working stroke, its output element 226 moves the wedge-shaped block 228 downwardly forcing its surface 230 along the surface 232 and thereby causing the slides 220 and 221 to move from their FIGURE 14 position to their FIGURE 15 position in opposition to the biasing force of the springs 222 and 223. As the slides 220 move, their cam surfaces 218 engage the pins 216 and depress the latch pin 210 to release the lever 108.

Upon the release of the lever 108, it moves under the influence of the springs 188 and 190 as shown in FIGURE 4 from its full line position to its phantom line position as there shown, thereby moving with it the slide block 178, the slide 160, and the rack 133 to the right as viewed in FIGURE 4 thus causing the actuator plate 130 to approach the die unit 120 and rotate the die segments 126a–h to increase the diameter of the iris 132 a predetermined amount (.06 inch) sufficient to permit restoration of the die assembly to its home position as illustrated in FIGURES 1 and 2 without contact with the workpiece during the return stroke.

The details of the combined gear and die segments 126 are illustrated in FIGURES 9 and 10 and their cross-sectional configurations in FIGURES 11 and 12. As viewed in side elevation in FIGURE 9, each die segment 126 has a spur gear segment portion 240 concentric with the axis of its bore 242 through which the journal pins 124 pass. In one practical embodiment, the pitch diameter is 3.375", the pitch is 16 and the pressure angle is 14.5°. The remaining portion of the periphery 244 of the die segment 125 is of spiral configuration decreasing from a maximum radius at section 11—11 to a minimum at section 12—12. As is apparent from FIGURES 10, 11 and 12, the peripheral surface 244 is of arcuate cross-section. The cross-sections of the surface 244 as one progresses from section 11—11 to section 12—12 represents arcs of circles of progressively increasing diameter and having their centers all lying in a common circle about the center of the bore 242. In the assembly of the segments, all such circles are tangent to the workpiece centerline. In the embodiments constructed, the radii of these circles about the centers of bores 242 are 1.625 inches. Two sets of such segments have been made and tested to date. In one of such sets, the diameter of the circle or iris 132 at the plane 11—11 as shown in FIGURE 11 is .300" and increases at a rate of .001" for each .010" of travel along the pitch circle of the gear segments of 3.375" pitch diameter to a maximum of .694" at the plane 12—12 as shown in FIGURE 12. In another of such sets, the diameter or circle or iris 132 at the plane 11—11 as shown in FIGURE 11 is .207 and increases at a rate of .001" for each .010" of travel along the pitch circle of the gear segment of 3.375" pitch diameter to a maximum of .770" at the plane 12—12 as shown in FIGURE 12.

As is apparent from FIGURE 11, the die segments 126 are arranged in circumferential juxtaposition and actuated so that the portions of their periphery 244 which are of like transverse arcuate extent are concomitantly positioned in a common plane transverse to the axis of die movement to define the iris 132. If there are but three die segments 126, the arcuate extent of the surface 244 of each of the die segments will each represent 120° of the circle of the iris and the segments will be assembled so that in all of their positions, they define a continuous circular periphery of the iris. In the illustrated embodiment, there are eight die segments 126 so that the arcuate of the peripheral groove 244 of each die segment 126 is 45°, there being a clearance of only .004"–.006" between the adjacent die segments at the periphery of the iris 132.

As is apparent, the foregoing operation is materially enhanced by flooding the surface of engagement between the die segments 126 and the workpiece 44 with lubricant. For this purpose, a pump motor and reservoir unit 250 is mounted on the carriage 66 at the rear of the machine.

In summary, the machine functions as follows:

A cylindrical tube 44 is gripped at both ends and tension or stretch applied axially. The tube 44 is thus held in a stationary position while a variable diameter draw die 120 is drawn over the tube 44, reducing the diameter of the tube 44 (in a tapering form) by a succession of passes.

The amount of reduction in diameter per pass is usually about .030" for the initial forming, diminishing to about .010" for the final pass. The tube 44 does not rotate during the forming pass, but is rotated slightly at the completion of each pass. (About ⅛ turn.) The purpose of this rotation after each pass, is to avoid passing the separation gaps (about .005") that occur between the variable dies over the same area of the tube 44 in succession.

The diameters of the orifice 132 of the variable diameter draw die 120, and thus the tapered form obtained on the tube 44, are controlled by a cam 104 through mechanical linkages.

To operate:

The tube 44 is inserted through the variable draw die 120 and into the headstock gripper assembly 36. The tailstock gripper assembly 38 is manually cranked to engage the tube 44. A predetermined amount of air pressure is applied to the air cylinder 42, thus placing the tube 44 under tension.

The feed screw handle 106 is manually adjusted to a predetermined setting on a calibrated dial 204. The cocking lever 108 is pushed forward to engage a latch 210. The machine is now ready to start forming the tube 44.

The operator presses a button that actuates the hydraulic transmission 88 and also starts lubricating or drawing oil to flood over the tube 44. The variable draw die 120 moves along the tube 44 (at approximately 4" per second) reducing the diameter of the tube 44 by a drawing action.

At the end of the stroke, a finger 100 depresses a microswitch 96 which:

(1) Reverses the hydraulic transmission 86, thus starting the variable draw die 120 on its return stroke.
(2) Releases the latch 210 of the cocking mechanism thereby allowing spring tension to open the orifice or "iris" 132 of the variable draw die 120 approximately .06" diameter.
(3) Shuts off the flood of lubricating oil.
(4) Indexes the tube 44 approximately ⅛ turn.

The variable draw die 120 now returns without touching the tube 44. At the end of the return stroke, a finger 98 engages another microswitch 94, which places the hydraulic transmission 86 into neutral position, thereby stopping the carriage 66.

The operator turns the feed screw handle 106 to obtain further reduction of the tube diameter, recocks the cocking mechanism, presses the start button and the cycle is repeated.

The operation is continued until the desired shape and size of tube is obtained. (Usually from five (5) to ten (10) passes.)

The stretch or tension applied to the tube 44 has an additional advantage of allowing control of the wall thickness of the tube 44, while it is being formed.

As the tube 44 is formed, into a tapering shape, displaced material (which is not allowed to flow into wall thickness because of the tension) causes the tube 44 to increase in length. This increase is taken up by an air cylinder assembly 42 and because the reversing switch 96 is mounted on the air cylinder assembly 42, the reversing always takes place at the same distance from the tailstock gripper 38, thus allowing continuous operation without having to stop to adjust the position of the reversing switch 96.

The action of the racks and dies in the variable draw die 120 is as follows:

A travel of .007″ of rack 133 to the left in FIGURE 4, results in a reduction of orifice 123, or "iris," diameter of .001″. A travel of .007″ of rack 133 to the right as viewed in FIGURE 4 results in an increase of orifice 132 diameter of .001″, in other words, a 7 to 1 ratio.

The 7 to 1 ratio is built into the dies. The racks and gears total a 1 to 1 ratio.

The purpose of the 7 to 1 ratio is to diminish any error in the cam 104 by seven (7) times, and in addition, gives a greater range of orifice diameters to each set of dies.

The range of diameters in the present variable draw die is about .560″.

For example: Say the smallest orifice diameter is .200″, then the largest orifice diameter in this set of dies would be .760″.

To date several sets of tungsten carbide dies, ranging from as low as .150″ diameter, to as high as 1.250″ orifice diameter have been constructed and use successfully.

The action of the dies on the tube should be regarded as a *drawing action* entirely, as no rotation takes place during the forming or drawing pass.

The term "drawing action," as herein used refers to such as the drawing of wire or tubing by pulling these through one piece "button dies" to reduce diameter.

A unique, and perhaps the most important feature of this invention is the discovery that the metal of the tube 44 does not extrude out into, or remain in, the "cracks" at the separation points between the die segments. In fact, for an ordinary reduction pass of .020″–.030″ of tube diameter, the ridges or raised portions are not perceptible to practical measurement (less than .0002″). As the tube is rotated, out of phase, for each succeeding pass the preceding ridges are "ironed out."

It has been found that if the tube is not rotated after each pass, but instead remains in one position for many passes, as for example if the tube has had a total reduction of .100″ diameter by a succession of 25 passes with no rotation, the ridges seem quite large, but are actually only .002″.

In applicant's opinion, any number of dies, from three (3) on up would function. However, the more dies that are used to obtain the orifice or "iris," the less pronounced the "scalloped effect" becomes, thereby creating a smoother and more bell-shaped entry or transition, into the "iris." The present design uses 8 dies, as this is the greatest number of dies which applicant believes this size assembly will effectively accommodate.

As is apparent from the foregoing description, in its broadest aspects, the present invention is not limited to the tapering of tubes or rods of circular cross-sections. The shape of the iris could be of triangular, square, rectangular, hexagonal, octagonal, eliptical, scalloped or even irregularly shaped, depending only upon the shape of the die segments and the number of die segments used. The tubes to make the above-mentioned shape would of course preferably be preformed into a predetermined cross-sectional diameter, tapered or otherwise, as hereinabove described and these preformed tubes then changed into the various forms mentioned above by use of shaped dies to fold or form with a succession of passes into the desired external configuration. During this operation the tube would of course not be rotated. The forming of a tapered tube into any of the above-mentioned shapes by any other means is a very difficult and costly process.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a machine for externally tapering tubular and rod-like workpieces:
   (a) means for supporting the workpiece along a predetermined longitudinal axis;
   (b) a draw die assembly having a peripherally continuous, variable cross-section iris, the iris of said die assembly being substantially circular and concentric with said longitudinal axis in said transverse plane and comprising at least three die segments circumferentially juxtaposed in equiangularly spaced relation about said longitudinal axis to define said iris in a form having a cross-sectional symmetrical about said longitudinal axis, each said segment being mounted for rotation about an axis tangent to a common circle concentric to said axis in said transverse plane, said die segments being identical and each having a spiral peripheral groove of concave arcuate cross-section, said die segments being assembled in circumferentially abutting relation about said longitudinal axis so that the like portions of their peripheral grooves lying in said common plane normal to said longitudinal axis define a continuous circular iris concentric with said longitudinal axis;
   (c) means mounting said assembly with its iris symmetrically disposed about said longitudinal axis in a plane transverse thereto;
   (d) means for producing relative longitudinal reciprocation along said axis between said supporting means and said assembly, the relative motion in at least one direction constituting a workpiece forming stroke;
   (e) means operable at the beginning of such workpiece forming stroke to constrict the cross-sectional area of said die assembly iris to engage a portion of the periphery of the workpiece; and
   (f) means for varying the cross-sectional area of the iris of said assembly incident to such relative longitudinal movement during at least said workpiece forming stroke to further constrict said iris during at least a portion of said workpiece forming stroke;
   (g) said iris diameter varying means including means for concomitantly rotating said segments about their rotation axes to bring into said plane portions of all of said die segments of like cross-section which for each such die segment are of successively differing peripheral length and radial spacing from said axis in said plane to thereby vary the cross-sectional area of said iris while maintainingg the continuity of the periphery thereof by progressively bringing into said plane successive like portions of the said peripheral grooves of said die segments, segment rotating means comprising a gear segment fixed to each die segment, a rack in said die assembly in engagement with each such gear segment, an actuator for simultaneously moving all of said racks in paths circumferentially disposed about and parallel to said longitudinal axis and cooperating cam means having a first part mounted for movement with said die assembly and a second part fixed relative to said workpiece mounting means, and means operatively connecting said cam means first part to said actuator.

2. The combination defined in claim 1 wherein said last named means includes means for manually adjusting the connection between said actuator and said cam means first part to thereby vary the diameter of thhe die assembly iris independently of said cam means.

3. The combination defined in claim 2 wherein said means operatively connecting said cam means first part to said actuator includes means responsive to movement of said die assembly to the end of its workpiece forming stroke to move said actuator to open the die assembly iris a predetermined amount prior to initiation of its return stroke and means operable upon completion of the die assembly return stroke to close the iris by said predetermined amount.

4. The combination defined in claim 1 wherein said last named means includes means responsive to movement of said die assembly to the ends of its forming stroke to move said actuator to open the die assembly iris a predetermined amount prior to initiation of its return stroke and means operable upon completion of the die assembly return stroke to close the iris by said predetermined amount.

5. In a machine for externally tapering tubular and rod-like workpiece:
   (a) means for supporting the workpiece along a predetermined longitudinal axis including means for rigidly supporting and fixedly positioning one end of the workpiece during a workpiece forming stroke, means for longitudinally movably supporting the other end of the workpiece during the workpiece forming stroke to accommodate longitudinal elongation of the workpiece during said forming stroke, and means incorporated in the means movably supporting said other end of said workpiece for maintaining an axial tension of substantially uniform, predetermined magnitude on said workpiece during said forming step;
   (b) a draw die assembly having a peripherally continuous variable cross-section iris;
   (c) means for producing relative longitudinal reciprocation along said axis between said supporting means and said assembly, the relative motion in at least one direction constituting the workpiece forming stroke; and
   (d) means for varying the cross-sectional area of the iris of said assembly incident to such relative longitudinal movement during at least said workpiece forming stroke to constrict said iris during at least a portion of said workpiece forming stroke.

6. In a machine for externally tapering tubular and rod-like workpieces;
   (a) means for supporting the workpiece along a predetermined longitudinal axis, said supporting means being fixed and including means for rigidly supporting one end of the workpiece during a forming stroke, means for maintaining the workpiece under longitudinal tension during the forming stroke, and means for longitudinally movably supporting the other end of the workpiece during the forming stroke to accommodate longitudinal elongation thereof during such forming stroke;
   (b) a draw die assembly having a peripherally continuous, variable cross-section iris and comprising at least three die segments circumferentially juxtaposed about said longitudinal axis to define said iris in a form having a cross-section symmetrical about said longitudinal axis and means for concomitantly adjusting said die segments to bring into said plane portions of all of said die segments of like cross-section which for each such die segment are of successively differing peripheral length and radial spacing from said axis in said plane to thereby vary the cross-sectional area of said iris while maintaining the continuity of the periphery thereof;
   (c) means mounting said assembly with its iris symmetrically disposed about said longitudinal axis in a plane transverse thereto including means mounting the assembly for longitudinal movement along said axis;
   (d) means for producing relative longitudinal reciprocation along said axis between said supporting means and said assembly, the relative motion in at least one direction constituting the workpiece forming stroke;
   (e) means operable at the beginning of such workpiece forming stroke to constrict the cross-sectional area of said die assembly iris to engage a portion of the periphery of the workpiece;
   (f) means for varying the cross-sectional area of the iris of said assembly incident to such relative longitudinal movement during at least said workpiece forming stroke to further constrict said iris during at least a portion of said workpiece forming stroke; and
   (g) means for circumferentially indexing the workpiece after each forming stroke a fraction of a revolution to shift each portion of the workpiece which was aligned with the junctures of adjacent die segments during the preceding forming stroke to a position beneath a die segment for the next succeeding forming stroke.

7. The combination defined in claim 6 wherein said iris cross-sectional area varying means includes means operative during each workpiece forming stroke of the die assembly for progressively decreasing the cross-sectional area of the iris to a predetermined minimum and thereafter progressively increasing the cross-sectional area of the iris to a predetermined maximum no greater than the original cross-section of the workpiece.

8. In a machine for externally tapering tubular and rod-like workpieces; and
   (a) workpiece supporting means for supporting the workpiece along a predetermined longitudinal axis including means for rigidly supporting one end of the workpiece during a forming stroke, means for maintaining the workpiece under longitudinal tension during such forming stroke, and means for longitudinally movably supporting the other end of the workpiece during the forming stroke to accommodate longitudinal elongation thereof during such forming stroke;
   (b) a draw die assembly having a peripherally continuous variable cross-section iris;
   (c) means mounting said assembly with its iris symmetrically disposed about said longitudinal axis in a plane transverse thereto and including means mounting said die assembly for longitudinal movement along said axis;
   (d) means for producing relative longitudinal reciprocation along said axis between said supporting means and said assembly, the relative motion in at least one direction constituting said workpiece forming stroke;
   (e) means operable at the beginning of such workpiece forming stroke to constrict the cross-sectional area of said die assembly iris to engage a portion of the periphery of the workpiece;
   (f) means for varying the cross-sectional area of the iris of said assembly incident to such relative longitudinal movement during at least said workpiece forming stroke to further constrict said iris during at least a portion of said workpiece forming stroke;
   (g) first and second stop means on said workpiece supporting means defining the limits of the longitudinal stroke of said die assembly; and (h) means on said draw die assembly for actuating said first and second stop means at the opposite ends of its stroke;

(i) the first stop means being adjacent said workpiece one end supporting means and being fixed to define the position of said die assembly at that end of its forming stroke and the second of said stop means being mounted on the movable portion of the supporting means for the other end of said workpiece in fixed relation to the end of a workpiece supported thereby to define the limit position of said die assembly at the other end of its forming stroke so that the longitudinal spacing between said stop means progressively increases with workpiece elongation.

9. The combination as defined in claim 8 wherein said first and second stop means define respectively the beginning and end of the working stroke of said die assembly and means responsive to actuation of said second stop means for automatically reversing the direction of motion of said die assembly.

10. The combination defined in claim 9 with means responsive to the actuation of said first stop means for automatically terminating operation of said reciprocation producing means.

11. The combination defined in claim 10 with means for selectively adjusting the cross-section of the die assembly iris prior to each workpiece forming stroke so that each successive workpiece forming stroke will produce progressively increased deformation of the workpiece.

12. The combination of the structure defined in claim 9 with means responsive to actuation of said second stop means for automatically increasing the cross-section area of said die assembly iris to prevent contact between the die assembly and the workpiece during the return stroke of said die assembly.

13. In a machine for externally tapering tubular and rod-like workpieces:

(a) means for supporting the workpiece along a predetermined longitudinal axis;

(b) a draw die assembly having a peripherally continuous, variable cross-section iris comprising at least three die segments disposed in equiangularly spaced relation about said longitudinal axis and each mounted for rotation about an axis tangent to a common circle concentric to said axis in said transverse plane, (c) means for producing relative longitudinal reciprocation along said axis between said supporting means and said assembly, the relative motion in at least one direction constituting a workpiece forming stroke; and (d) means for varying the cross-sectional area of the iris of said assembly incident to such relative longitudinal movement during at least said workpiece forming stroke to further constrict said iris;

(e) the means for constricting said iris comprising means for concomitantly rotating said segments about their rotation axes which comprises a gear segment fixed to each die segment, a rack in said die assembly in engagement with each such gear segment, an actuator for simultaneously moving all of said racks in paths circumferentially disposed about and parallel to said longitudinal axis and cooperating cam means having a first part mounted for movement with said die assembly and a second part fixed relative to said workpiece mounting means, and means operatively connecting said cam means first part to said actuator.

14. In a machine for externally tapering tubular and rod-like workpieces:

(a) means for supporting the workpiece along a predetermined longitudinal axis including means for rigidly supporting one end of the workpiece during a forming stroke, means for maintaining the workpiece under longitudinal tension during the forming stroke, and means for longitudinally movably supporting the other end of the workpiece during the forming stroke to accommodate longitudinal elongation thereof during such forming stroke;

(b) a draw die assembly having a peripherally continuous, variable cross-section iris;

(c) means for producing relative longitudinal reciprocation along said axis between said supporting means and said assembly, the relative motion in at least one direction constituting the workpiece forming stroke;

(d) means for varying the cross-sectional area of the iris of said assembly incident to such relative longitudinal movement during at least said workpiece forming stroke to further constrict said iris; and (e) means for circumferentially indexing the workpiece after each forming stroke a fraction of a revolution to shift each portion of the workpiece which was aligned with the junctures of adjacent die segments during the preceding forming stroke to a position beneath a die segment for the next succeeding forming stroke.

15. In a machine for externally tapering tubular and rod-like workpieces:

(a) means for supporting the workpiece along a predetermined longitudinal axis including means for rigidly supporting one end of the workpiece during a forming stroke and means for longitudinally movably supporting the other end of the workpiece during the forming stroke to accommodate longitudinal elongation thereof during such forming stroke;

(b) a draw die assembly having a peripherally continuous, variable cross-section iris;

(c) means for producing relative longitudinal reciprocation along said axis between said supporting means and said assembly, the relative motion in at least one direction constituting the workpiece forming stroke;

(d) means for varying the cross-sectional area of the iris of said assembly incident to such relative longitudinal movement during at least said workpiece forming stroke to constrict said iris during at least a portion of said workpiece forming stroke;

(e) first and second stop means on said workpiece supporting means defining the limits of the longitudinal stroke of said die assembly; and (f) means on said draw die assembly for actuating said first and second stop means at the opposite ends of its stroke;

(g) the first stop means being adjacent said one end of said workpiece and being fixed to define the position of said die assembly at that end of its forming stroke and the second of said stop means being mounted on the movable portion of the supporting means for the other end of said workpiece in fixed relation to the end of the workpiece supported thereby to define the limit position of said die assembly at the other end of its forming stroke so that the longitudinal spacing between said stop means progressively increases with workpiece elongation.

16. In a machine for externally tapering tubular and rod-like workpieces:

(a) means for supporting the workpiece along a predetermined longitudinal axis;

(b) a draw die assembly having a peripherally continuous, variable cross-section iris;

(c) means for producing relative longitudinal reciprocation along said axis between said supporting means and said assembly, the relative motion in at least one direction constituting a workpiece forming stroke;

(d) means for varying the cross-sectional area of the iris of said assembly incident to such relative longitudinal movement during at least said workpiece forming stroke to constrict said iris during at least a portion of said workpiece forming stroke; and
(e) means automatically operable at the end of said workpiece forming stroke to reverse the relative motion between the supporting means and the draw die assembly and reposition said assembly relative to said supporting means for a subsequent workpiece forming stroke.

17. The combination defined in claim 16, together with:
(a) means operable at the beginning of the workpiece forming stroke to constrict the cross-sectional area of said die assembly iris to engage a portion of the periphery of the workpiece; and
(b) means automatically operable incident to the repositioning of the draw die assembly at the end of each workpiece forming stroke for enlarging said cross-sectional area of said die assembly iris and thereby permitting said repositioning to be effected without workpiece damaging contact between said workpiece and said die assembly.

References Cited

UNITED STATES PATENTS

| | | | |
|---|---|---|---|
| 73,715 | 1/1868 | Harding | 72—285 |
| 168,975 | 10/1875 | Farmer | 72—277 |
| 2,029,552 | 2/1936 | Barnhart. | |

WILLIAM W. DYER, JR., *Primary Examiner.*

ANDREW, R. JUHASZ, *Examiner.*

G. A. DOST, *Assistant Examiner.*